May 8, 1962 J. ARCHER ET AL 3,033,943

MAGNETIC RECORD CARRIER

Filed July 15, 1958

INVENTOR
JOHN ARCHER
JOHN L. OWNER

BY [signature]
AGENT 3,033,943

MAGNETIC RECORD CARRIER

John Archer, London, and John Lechmere Owner, Dulwich, England, assignors to North American Philips Company, Inc., New York, N.Y.

Filed July 15, 1958, Ser. No. 748,765
Claims priority, application Great Britain July 17, 1957
3 Claims. (Cl. 179—100.2)

The invention relates to magnetic record carriers for magnetic recording and reproducing. It has previously been proposed to utilize a magnetic record carrier consisting of a magnetic recording medium having thereon guide means so as to define a plurality of elongated record tracks, for use in conjunction with a magnetic head movable along and guided in the direction of a selected track. The said guide means in one embodiment consisted of a strip-like guide affixed to the planar record medium. In one form of construction it has been proposed to make the guide strips integral with the carrier, the magnetic recording medium being present in the form of narrow strips between the guides. In this construction however there is some sacrifice of the control of the resilience of the track portion of the carrier that is beneath the strips. It has been found that there is an optimum resilience of said track portion and it is desirable to operate as near to this optimum as possible.

A composite structure for the record carrier which consists of guide strips affixed to a sheet of magnetic recording film, may have a backing layer of predetermined resilience, e.g. a resilient paper, and a support layer of semi-rigid material such as card. Such a structure enables the resilience to be adjusted to be near the said optimum and kept under control during manufacture more easily than with the integral construction abovementioned.

There is another advantage of a composite structure produced by affixing guides to a sheet carrier precoated with a magnetic recording medium, which is the possibility of reducing the noise to a minimum value by orienting the sheet with respect to the guides prior to affixing the guides thereto. This follows from the fact that magnetic recording sheet made under modern conditions is often prepared by a process involving grain orientation by magnetic fields in a direction preferred by reason of the lower noise obtained when the sheet is scanned by a magnetic head in a direction related to that direction.

The manufacture of a composite form of record carrier having the advantages of controlled resilience and a choice of orientation of the magnetic record sheet with respect to the guides can be carried out using adhesives, but it has been found that there are disadvantages with this method of composition. For example, in the manufacture of this type of structure it has been found difficult to suitably affix the said strips. When adhesives are used for this purpose we have found that with repeated use the ends of the strips tend to peel off. According to the invention a magnetic recording medium of substantially sheet form has guide means for example, of strip-like form attached thereto by stitches. Such a magnetic recording medium is intended for example for use with a hand held magnetic recording or reproducing device including a record/play head, an amplifier and power source e.g. a battery whereby the said head may be moved along a selected track defined by said guide means and over the said medium to effect recording or reproduction in the known manner. According to a feature of the invention the stitches are arranged to protrude above the level of the said strips whereby to afford support to a slider carrying a magnetic recording/playback head which which may be in the form of the device above referred to. In order that the invention may be more clearly understood, it will now be described with reference to the accompanying drawings in which:

Figures 1, 2:
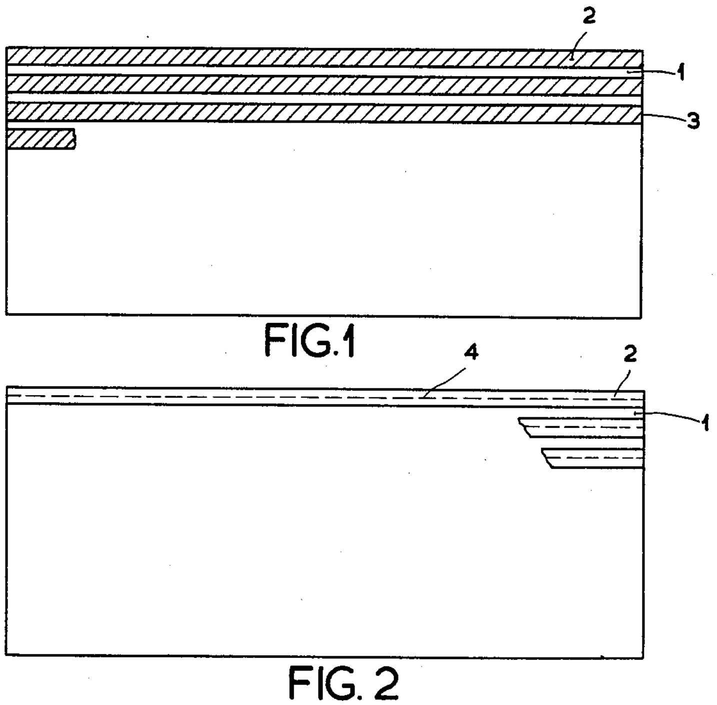
FIGURE 1 shows a plan view of a magnetic record sheet having guide strips or bars thereon, attached as by an adhesive.
FIGURE 2 shows a plan view of a magnetic record carrier having strips attached by stitching.

In FIGURE 1 a magnetic recording means consists of a base layer of card or like semi-rigid material having an intermediate layer of resilient material such as blotting paper upon which is carried a thin sheet of magnetic recording film, the latter film being of the type commonly used in the magnetic recording industry. Fixed upon the magnetic surface of the said film are arranged strips 2 of cardboard, plastic or like material. The strips 2 are spaced apart as shown so as to define record tracks 1 which are exposed areas of the magnetic coating on the film. The method of fixing the strips 2 has hitherto been carried out by the use of adhesives and it has been found that with use the ends such as 3 have tended to peel up and this has meant that the record has become almost unuseable when a slider carrying a magnetic recording head is applied thereto and guided by the strips since movement of the said slider in a direction along the tracks 1 has been found to be impeded or diverted by the peeling up of the ends 3 so that a more permanent method of fixing the strips 2 has been found necessary.

FIGURE 2 shows an improved form of magnetic record having guide means thereon consisting of strips 2 defining tracks 1 spaced therebetween, but in this improved form the strips 2 which, for example, may be of celluloid are fixed by means of a stitching operation for example by passing the strips, the magnetic record film and the backing layer or layers underneath the film through a sewing machine using cotton or silk thread so that all these parts are bound together. The stitching employed is preferably along a straight line as shown at 4, being approximately the center line of a strip. The magnetic record is intended for use in conjunction with a magnetic head carried by slider which can slide along the strips 2 and be supported thereon while at the same time the edges of the strips 2 give guidance to a protruding pole piece of the magnetic head itself. The slider carrying the magnetic head is moved preferably by the hand in the direction of one of the tracks 1 and it might be thought that slider movement over the raised stitches 4 might cause a jerky motion but much to our surprise we have found that the use of raised stitches gives superior results to those obtained when the slider is moved over plain strips as those shown at 2 in FIGURE 1. It appears that the stitches act rather like rails having relatively low frictional losses while the interruption between stitches appears of no consequence provided the length of the slider is such that it covers a sufficient number of stitches, such as twenty.

Figure 3:
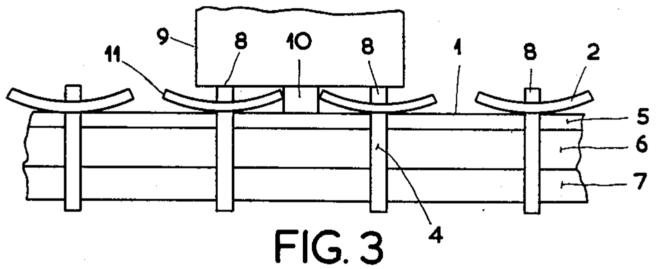
FIGURE 3 shows an end on view of the same magnetic record as shown in FIGURE 2.

FIGURE 3 shows an end on view on an enlarged scale of a part of a magnetic record of the type shown in plan in FIGURE 2 in which strips 2 define magnetic tracks 1 and the stitches 4 are shown going through strips 2, the magnetically coated film 5, the resilient layer next underneath this being denoted by 6 and the card backing being shown at 7. The raised portion of the stitch 4 is shown at 8 and it will be seen from the drawing that a slider 9 which is supported on the said raised stitch portions 8 is enabled to have relatively small effective contact area with the said stitches in comparison with that which would have occurred if the said slider has been supported on the strip guides 2. It is thought that it is these lower areas of contact which occur with stitches which give the improvement which has been described above. The operative faces of the pole pieces of the magnetic recording head carried by the slider 9 are shown in FIGURE 3 as engaging the magnetic surface of the film 5 and it is the side of these pole pieces 10 which is guided by the edge 11 of the strips 2 so as to ensure the correct traverse along the required track 1 on the surface of the magnetic film 5.

Figure 4:
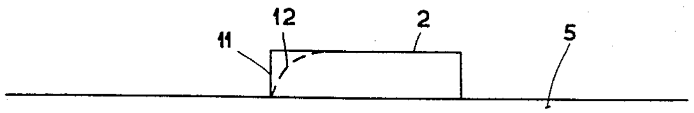
FIGURE 4 shows an end view of a guide strip.

A further advantage of stitching which is not easily obtained with adhesives is the fact that while the center of the strips 2 is held down by the stitches against the surface of the magnetic medium 5, the edges 11 are not so held and are able to rise slightly as shown but exaggerated in FIGURE 3. This is of very great value in guiding the pole piece 10 since it tends to prevent the said pole-piece from jumping up over the guide edge. This occurs because of the fact that lateral pressure of pole piece 10 against edge 11 tends to cause the said edge to separate further from the surface of track 1 and thus tend to prevent edge-jumping even more effectively. On the other hand an excessive separation of edge 11 from the track 1 is prevented by the normal downward pressure of slider 9 on stitch portion 8 resulting in the under surface of this slider acting as a limit for upward movement of edge 11. Furthermore edge-jumping does not become appreciably more likely with wear of an edge 11 as shown, whereas with a guide 2 fixed with an adhesive over the whole of its bottom surface as shown on a large scale in FIGURE 4, the edge 11 which exists prior to wear, degenerates with wear to a bevelled edge 12 as shown dotted in FIGURE 4. Clearly an edge of the form 12 facilitates edge-jumping.

What is claimed is:

1. A magnetic record carrier comprising a magnetic recording medium of substantially sheet form having a longitudinal direction and a transverse direction, a plurality of strips composed of an insulating material arranged on said sheet in the longitudinal direction, said strips being spaced from each other in the transverse direction to define a plurality of exposed magnetic tracks, each strip being attached to said sheet by a plurality of stitches composed of insulating material, said stitches running in the longitudinal direction and protruding above the level of the strips, said strips and said stitches forming a guide for a magnetic head adapted to co-act with said medium.

2. A magnetic record carrier comprising a magnetic recording medium of substantially sheet form, an insulating resilient layer adjacent to and below said recording medium, an insulating relatively rigid card backing adjacent to and below said resilient layer, said carrier having a longitudinal direction and a transverse direction, a plurality of strips composed of an insulating material arranged on said sheet in the longitudinal direction, said strips being spaced from each other in the transverse direction to define a plurality of exposed magnetic tracks, each strip being attached to said carrier by a plurality of stitches composed of an insulating material and running in the longitudinal direction, each stitch passing through and affixing to each other: the strip, the recording medium, the resilient layer and the backing, the stitches protruding above the level of the strips, said strips and said stitches forming a guide for a magnetic head coacting with said medium.

3. A magnetic record carrier as set forth in claim 1, wherein said recording medium is grain oriented so as to have a minimum noise level in the longitudinal direction.

References Cited in the file of this patent

UNITED STATES PATENTS

| | | |
|---|---|---|
| 1,656,216 | Melby | Jan. 17, 1928 |
| 2,501,126 | Howell | Mar. 21, 1950 |
| 2,548,011 | Frost | Apr. 10, 1951 |
| 2,822,425 | Hicks | Feb. 4, 1958 |

FOREIGN PATENTS

| | | |
|---|---|---|
| 1,053,854 | France | Feb. 5, 1954 |